United States Patent [19]
Richter et al.

[11] Patent Number: 5,133,041
[45] Date of Patent: Jul. 21, 1992

[54] METHOD AND APPARATUS FOR TRANSPORTING COMMODITIES, ESPECIALLY LIQUID COMMODITIES, AT TEMPERATURES ABOVE THEIR CONGEALING POINT IN TANKS OR TANK CONTAINERS, AS WELL AS A METHOD AND APPARATUS FOR CLEANING THE TANKS OR TANK CONTAINERS

[76] Inventors: Gerhard Richter, Matzenberger. 143; Heinz-Herbert Lindenau, Pfaelzer Str. 76a, both of 4200 Oberhausen 11, Fed. Rep. of Germany

[21] Appl. No.: 403,592

[22] Filed: Sep. 5, 1989

[51] Int. Cl.$^5$ .............................................. F27D 11/00
[52] U.S. Cl. ..................... 392/307; 392/308; 392/311; 392/314; 237/12.3 C; 123/3; 126/344
[58] Field of Search ............... 219/279, 326, 325, 312, 219/314; 165/12.3 B, 12.3 C; 237/33, 45, 35, 46, 12.3 C; 239/130; 126/343.5, 344; 123/3, 489, 590, 523; 392/307, 308, 311, 314, 322, 441, 465; 426/237

[56] References Cited

U.S. PATENT DOCUMENTS

| | | | |
|---|---|---|---|
| 4,125,090 | 11/1978 | Masunaga et al. | 123/3 |
| 4,705,214 | 11/1987 | Johnson | 237/12.3 C |

*Primary Examiner*—Bruce A. Reynolds
*Assistant Examiner*—Tu Hoang
*Attorney, Agent, or Firm*—Toren, McGeady & Associates

[57] ABSTRACT

A method and an apparatus for transporting commodities, especially liquid commodities above their congealing temperature in a tanks or tank containers. At least a partial flow of hot exhaust gases of an internal combustion engine of a tank vehicle or tank container vehicle flows through a heat exchanger through which passes the heat transfer oil in a closed cycle and yields heat to the heat transfer oil and an electrically heated heat exchanger yields heat to the heat transfer oil and the heat transfer oil transfers heat to the commodity through a tank or tank container wall heat exchanger. The heat transfer oil is conducted in a closed cycle in a regulation circuit including the heat exchanger through which the exhaust gas passes and the electrical heat exchanger. The temperature of the heat transfer oil is controlled as a function of a variable reference and the variable reference is preset as a function of the temperature of the commodity to be transported and contained in the tank or tank container, so that the variable reference is always higher than a specified temperature of the commodity to be transported.

52 Claims, 4 Drawing Sheets

METHOD AND APPARATUS FOR TRANSPORTING COMMODITIES, ESPECIALLY LIQUID COMMODITIES, AT TEMPERATURES ABOVE THEIR CONGEALING POINT IN TANKS OR TANK CONTAINERS, AS WELL AS A METHOD AND APPARATUS FOR CLEANING THE TANKS OR TANK CONTAINERS

BACKGROUND OF THE INVENTION

The invention is directed to a method for transporting commodities, especially liquid commodities above their congealing temperature in tanks or tank containers, wherein at least a partial flow of the hot exhaust gases of the internal combustion engine of a tank- or tank container-vehicle flows through a heat exchanger, through which heat transfer oil passes in a closed cycle and which yields heat to the heat transfer oil and/or wherein an electrically heated heat exchanger yields heat to the heat transfer oil and the heat transfer oil transfers heat to the commodity through the tank or tank container wall designed as a heat exchanger, as well as an apparatus for performing the method.

Furthermore, the invention is directed to a method for cleaning tanks and tank containers after the transport of the commodities has been terminated, especially after termination of transporting liquid commodities above their congealing temperature, with a cleaning agent, which can be a cleaning solution, water (cold and/or hot water) and/or steam.

In the sense of the invention the commodities to be transported include liquid, pasty, pourable or fluid, generally speaking heapable bulk goods, among these oils, resins, varnishes, granulates, furthermore foodstuffs, such as olive oil, liquefied eggs, milk and the like. The invention means by liquid, especially such commodities to be transported above their congealing temperature, commodities whose congealing temperature is such, that under the prevailing environmental temperatures they can at least partially congeal in the tanks or tank containers, wherein mainly those tanks and tank containers in the region of the rear axle of the tractor trailer units can be exposed to an increased or accelerated cooling due to the high velocities of the head wind.

Examples of these commodities are phthalate anhydride, maleic anhydride, greases, tar products etc., which are transported from chemical plants to the processing plants which fabricate end products therefrom.

These difficulties in transportation result from the circumstance that the congealing temperatures generally lie far above the usual air temperatures, meaning the environmental temperatures, for instance they are 130° C. for phthalate anhydride, whose loading or charging temperature amounts to 160° C.

Thus there always exists the danger that these products congeal at least partially or arrive at the processing plants in a congealed state. In these cases they must be brought to a sufficiently high temperature prior to draining from the tank.

In actual practice one passed for a long time past steam from stationary steam generation plants at a pressure of approximately 5 to 7 bar through tubes or semi-round tubes welded to the tanks.

Up to recently it was only possible to perform long distance transport of these products also in conditions for extreme cold in this manner.

Apart from these problems additional disadvantages arise: If a product which is only partially congealed is heated, local overheating occurs and with this also discolorations so that the product is no longer usable.

The reason for this lies above all in the circumstance that, even after only a partial congealing, a product can no longer circulate in all regions to the required extent when heated, so that a local overheating can be avoided.

At the same time a temperature reduction of the charged product through heat losses to the cold tank occurred since generally en route no or insufficient addition of heat could be assured. Tests with electrical heating belts have also become known which belts were wound around a tank wall cf tank trailer cars.

It was however seen that this type of heat transfer to the product required considerable amounts of energy and that the heat transfer from the heating belts to the tank was bad.

A marked source of danger consists in accumulation of vapors of the chemical products in the insulation, which can trigger explosions in case of faulty electrical installations.

Tractor trailer units for transportation of liquid commodities are known for solving these problems (De-OS 34 11 358.4-16).

They comprise a heat exchanger flanged directly downstream of the exhaust manifold, through whose bundle of tubes flows at least a partial stream of the hot exhaust gases of the internal combustion engine and past which flows heat transfer oil.

The heat transfer oil is contained in a closed cycle circulation and yields the heat it has absorbed to the contents of the tank.

It was seen that the transportation of liquid commodities above their congealing temperature is securely assured also at extremely low temperature and/or during long distance travel and that stops at substations for the purpose of heating the contents of the tank are no longer required en route.

Because of the high heat capacity of the heat transfer oil already relatively small quantities are sufficient, in order to assure reliably in tractor trailer trucks, that even a partial congealing of the contents of the tank is eliminated by appropriate flow velocities of the heat transfer oil.

The same applies to tank containers.

When delivering to a chemical plant or in the course of pickups at a chemical plant or a loading point the tank can be preheated to the temperature of the liquid commodity to be charged or loaded, so that stresses of the tank material are considerably reduced even at extremely low outside temperatures.

At the same time the temperature drop of the product in the tank is considerably reduced and in the course of the travel heat is continuously supplied to the tank by the heat transfer oil, so that the temperature fluctuations caused by this hitherto in the tank wall are eliminated and no cold spots at which the contents of the tank could congeal can arise in the tank, especially in the region of the domes and the valves.

The same problems arise if liquid commodities whose congealing temperatures lie above the environmental temperatures must be transported in tank containers.

Tank containers comprise frames consisting of box sections, whose dimensions correspond to the dimensions of the containers and where tanks for transportation of liquid commodities are arranged.

These tank containers are transported on the highway like conventional containers, they are reloaded in ports and container stations onto ships or open freight cars. They are reloaded again at a destination point and transported on the highway to their ultimate destination.

It is known to provide tank containers also with electrical heating belts or tapes (prospectus of the firm Holvrieka, B. V. in the Rotterdam area), in order to transmit heat to the tank container during transportation on the highway.

For this purpose the tractor trailer trucks include an electric generator coupled with an internal combustion engine and arranged as a structural unit behind the operator cab of the tractor trailer truck. Electrical couplings produce the detachable connection with the heating belts or tapes.

These tank containers are connected to the ship's electrical network, after they have been reloaded onto ships. It was however seen in actual practice, that already during highway transport a cooling and at least a partial congealing of the contents of the tank container could not be altogether avoided by the electrical heating of the tank. The additional heat losses of the tank contents during the reloading must be added hereto, which results in a further cooling.

Furthermore it was seen in actual practice that it is impossible to reheat a product, which has cooled in the time interval required for reloading the containers onto ships, to the original temperature by means of the heating tapes arranged on the tank wall.

Presumably no sufficient motion in the tank content (stirring effect) for a temperature compensation occurs any longer below a respective specific temperature for the previously defined liquid commodities, so that then local overheating occurs, which can entail product discoloration.

Similar problems arise with tank containers during rail or waterborne transport, if said containers are reloaded from the highway onto rail cars or onto a ship or in reverse. Furthermore heatable tank containers for the combined transport of liquid commodities on the highway on the rail or on water above their congealing temperatures in the heatable tank containers are known (DE-OS 36 23 145), which assure that the liquid commodities are maintained above their congealing temperatures also at extremely low ambient temperatures and-/or long distances traveled and/or long reloading times and/or long periods while parked and/or long transportation interruptions.

For this purpose heat transfer oil circulating in a closed cycle absorbs heat from a heat exchanger during transport of a tank container on the highway, through which heat exchanger combustion gases of a road vehicle hauling the tank container flow. The heat transfer oil circulating in a closed cycle extracts heat from an electrically heated heat exchanger during rail-borne or water-borne transport of the tank container and transfers the heat thus removed through the tank wall designed as a heat exchanger to the contents of the tank.

Basically the supply of calrods with electrical energy in the course of water or rail-borne transport can be accomplished by a generator which is coupled with the internal combustion engine.

During transport of the tank container by rail electrical energy is fed into the electrically heatable heat exchanger by the overhead line of the railroad electrical supply network and during water-borne transport it is fed into the electrically heated heat exchanger from the shipboard electrical network of the transportation vessel.

The energy supply from the overhead line of the railroad network is accomplished simply by having electrical supply lines extend from the electric locomotive to the transport cars of the tank containers.

Many products must not only be transported above their congealing temperature, rather it is required in many cases that the maximum upper temperature is not exceeded, this for instance in the case of greases and oils.

Furthermore chemical products exist which become unstable and disintegrate below a lower limit temperature and which decompose above an upper limit temperature.

Thus the chemical product of the firm ICC marketed under the trademark Peg 4000 has a lower limit temperature of 115° C. and an upper limit temperature of 125° C. and is to be transported at an average temperature of about 120° C.

A complication which such commodities is that, because of the high market price, they are often transported in small quantities of several hundred liters, while conventional tanks and tank containers have a volumetric capacity of 30,000 liters or above.

It must be added that the shipping is to be performed whatever the environmental temperatures, meaning sometimes at −30° C. and sometimes at above 40° C.

It also must be said that the exhaust gas quantities of the internal combustion engines fluctuate greatly in view of the frequent load changes and that the exhaust gas temperatures are also subject to great fluctuations.

SUMMARY OF THE INVENTION

The invention is based upon the task of creating a method and an apparatus for shipping of commodities, especially of liquid commodities at a predetermined temperature above their congealing temperature in tanks or tank containers, which assure a secure transport of also small quantities and of commodities having limit temperatures close to each other independently of the ambient temperatures.

Different commodities in any random sequence are shipped in tanks and tank containers and same must be cleaned before accepting another product for shipping. Generally this cleaning process was accomplished hitherto in stationary installations with solvents and/or water or steam.

It is also known (EP 0 262 261) to clean the tanks of tank semi-trailers or trailers during the shipping periods. For this purpose tank tractor trailers comprise a storage reservoir with a cleaning solution, which can also be water.

The storage reservoir can be electrically heatable.

After the tanks have been emptied, nozzles connected to the storage reservoir are suspended in the tank in the region of the dome, which can flush the inside wall of the tank: with a cleaning solution, warm water, hot water or steam also during the travel period.

The residues or the aqueous solution obtained are collected in a drainage reservoir.

In many cases however it is insufficient to merely flush the tank. Often it is necessary to dry the inner wall of the tank, a requirement which has to be satisfied with a multitude of chemical products. Often sterilizing of the tank is specified, which is absolutely necessary before foodstuffs are shipped in it.

Thus the invention is based upon the additional task, to refine this known method in such a way, that a secure cleaning is accomplished also with the previously mentioned products and liquid products, without that residues of the products can deposit themselves in a solid manner at the inside wall of the tank or the tank container, that the inside wall can be dried and then furthermore especially with foodstuffs, such as milk, etc. a safe sterilization is assured. The coldest point of the inside wall of the tank or the tank container must be maintained at a temperature of above 100° C. for a predetermined minimum time period, which is generally specified as at least ten minutes.

The task consists of creating a method for shipping of commodities, especially of liquid commodities at a predetermined temperature above their congealing temperature in tanks or tank containers, which assure a safe shipment of also small quantities and of commodities with closely spaced limit temperatures independently of the outside temperatures, wherein at least a partial flow of the hot exhaust gases of the internal combustion engine of a tank- or container vehicle flows through a heat exchanger, through which heat transfer oil passes in a closed cycle and which heat exchanger yields heat to the heat transfer oil and/or where an electrically heated heat exchanger yields heat to the heat transfer oil and the heat transfer oil transmits heat to the liquid commodity through the tank or container wall designed as a heat exchanger; this task is solved according to a first basic solution in the invention in that the heat transfer oil is circulated in a regulator circuit in a closed cycle, which regulator circuit comprises the heat exchanger through which the combustion gases flow and/or the electrical heat exchanger, and the temperature of the heat transfer oil is controlled as a function of a variable reference and the variable reference is predetermined as a function of the commodity to be shipped and contained in the tank or the tank container.

The electrically heatable heat exchanger is used if the tank or tank container is transported by railroad or aboard ship or if it can be connected to an electrical distribution network at a parking station, so that the internal combustion engine need not be operated when the transport vehicle is stopped. Such a heat exchanger is provided especially in tank containers and is used during shipment by railroad or aboard ship and at parking stations, generally during the above-mentioned reloading processes.

The variable reference is a temperature selected in such a way that it is always higher than the specified temperature of the commodity to be shipped.

The difference between these two temperatures decreases with decreasing amounts of commodity in the tank or the tank container, in general: this difference decreases with decreasing heat capacity of the commodity to be shipped and furthermore it is lower or higher, the higher or lower is the outside temperature.

These measures result in a simple and secure control of all occurring heat capacities and outside temperatures.

The optimum predetermination of the variable reference can be experimentally determined on test runs for products to be envisaged, it can also be determined by methods of system analysis.

These measures safely eliminate an "overshoot" of the tolerance limits of for instance the above-mentioned limit temperatures.

Especially is it not required to differentiate the temperature curves recorded by temperature sensors with respect to time and to use then the values derived therefrom for regulation or control.

Surprisingly the above-mentioned product Peg 4000 could be transported at the first attempt without problems over long distances. The same applies for detergent raw materials.

In another embodiment of this first basic solution the temperature of the heat transfer oil is additionally regulated as a function of the air, which has to be added to the exhaust gases flowing through the heat exchanger.

Through these measures it is possible to avoid a sudden and excessive heating of the heat transfer oil with full load especially on steep grades.

In particular it is avoided in such extreme operating conditions that the heat transfer oil in the heat exchanger is excessively heated and cracking of the oil can occur.

In another embodiment of this first basic solution the hot exhaust gases flow through an arrangement for burning fuel (for instance heating oil) and/or for burning the soot particles in diesel exhaust gases located in upstream direction before the heat exchanger through which the heat transfer oil flows.

It is achieved by these measures that a sufficient supply of heat is assured to the contents of the tank even at high transportation temperatures, which can be especially important in partial power operation, especially during protracted drives downhill.

Thus it is in principle possible with this arrangement to maintain the temperature of the heat transfer oil always above the temperature of the commodity to be transported, so that heat is not extracted by the heat exchanger from the commodity to be transported and imparted to the exhaust gases.

In yet another embodiment of this basic solution the hot exhaust gases flow through an additional heat exchanger, through which passes the heat transfer oil, and which is arranged for temperature regulation of the heat transfer oil downstream behind the heat exchanger, through which the heat transfer oil flows.

In these cases use is being made of the circumstance that the exhaust gases in the exhaust manifold cool rapidly as the distance from the engine increases and thus are able to transfer an increasingly smaller amount of heat to the heat transfer oil.

It is basically possible, to switch the first heat exchanger off if the transport temperature of the commodity to be transported is high and to switch the second heat exchanger on if said temperature is relatively low. It is also possible to operate both heat exchangers simultaneously, in order to control the temperature of the heat transfer oil within close limits.

Both heat exchangers can alternately or together be arranged in a bypass of the exhaust manifold.

In yet another embodiment of the invention the heat transfer oil can additionally flow for temperature control through a heat exchanger acted upon by the ambient air.

It is achieved by a single one or several of these measures, that the entire exhaust gas flow can always flow through the heat exchanger adjacent to the exhaust manifold.

According to a second basic solution the task is solved in that the heat transfer oil is conducted in a closed cycle through at least two regulator circuits; the first regulator circuit comprising the heat exchanger through which the combustion gases flow and/or the electrical heat exchanger, the temperature of the heat transfer oil is controlled as a function of one variable reference; in the second regulator circuit comprising at least one heat exchanger for the transfer of heat contained in the heat transfer oil to the tank or tank container contents, the temperature is controlled as a function of the variable reference or an additional variable reference and that the variable reference or references is or are predetermined as a function of the commodity to be transported and contained in the tank.

It is achieved by these measures, that in the second regulator circuit a smaller quantity of heat transfer oil than in the first regulator circuit can transmit heat to the tank or tank container contents, so that an accurate heat transmission at a lower heat constant (referred to the second regulator circuit) can be accomplished without necessitating excessive investment of apparatus.

Especially in the first regulator circuit the temperature can be controlled to be constant with negligible fluctuations.

Furthermore the transfer of heat to the tank or tank container contents can be performed with three heat exchangers in the second regulator circuit, wherein the one heat exchanger compensates the increased heat loss in the region of the rear axle and the front heat exchanger compensates the increased heat loss in the region of the front end wall of the tank or the tank container exposed to the head wind.

A very close control results from regulating the in and outflow of each of the three heat exchangers in such a way, that the heat transfer oil contained in them is at the same temperature.

The electrical heat exchanger is provided for the same reason as in the first basic solution.

In yet another embodiment of the invention the temperature of the heat transfer oil is regulated additionally as a function of the air to be added to the exhaust gases flowing through the heat exchanger, just as was the case in the first basic solution.

Furthermore, the hot exhaust gases can for the same purpose as in the first basic solution flow through an arrangement for additional combustion of fuel and/or of the soot particles in diesel exhaust gases, said arrangement. being located upstream ahead of the heat exchanger through which the heat exchanger oil flows; it is possible for the hot exhaust gases to flow through an additional heat exchanger through which heat transfer oil flows arranged downstream behind the heat exchanger through which heat transfer oil flows, all this for temperature regulation of the heat transfer oil: finally, the heat transfer oil can additionally flow through a heat exchanger acted upon by surrounding air for purposes of temperature regulation.

The task of creating a method for cleaning of tanks and tank containers with a cleaning agent, after terminated transportation of commodities, especially after terminated transportation of liquid commodities above the congealing temperature, is solved in the invention in that the hot exhaust gases of the internal combustion engine of a tank- or tank container vehicle flow through a heat exchanger, through which passes heat transfer oil in a closed cycle, and that said exhaust gases transfer heat to the heat transfer oil and/or that an electrically heated heat exchanger yields heat to heat transfer oil circulated in a closed cycle and that the heat transfer oil yields heat to an arrangement for warming, heating and/or evaporating the cleaning agent used for cleaning the tanks or the tank containers.

Basically it is possible to only clean tanks and tank containers or, after the above-mentioned process, to transport the commodities at a predetermined temperature and then to clean the tank or tank container en route or at a way station.

This measure further achieves that the residues of the product after cleaning with water and/or steam are controllably collected in a container for recycling or a safe waste disposal and are shipped to the manufacturer.

It was surprisingly seen that the tank and tank containers are cleaned so safely and neatly as this was hitherto only possible in stationary installations.

The electrically heated heat exchanger is provided in order to transfer heat to the heat transfer oil when the motor is stopped; this can occur either while stopped or during transportation on rail or aboard ship.

It is required in many cases, after draining tanks and tank containers, that a deposition of residues of the transported commodity at the cooling inner wall of the tank or tank container is avoided.

In another embodiment of the invention therefore the heat transfer oil yields heat already during and before the cleaning process to the tank or container wall configured as a heat exchanger.

In another embodiment of the invention according to a first design principle the heat transfer oil is conducted in the regulation circuit comprising the heat exchanger, through which the combustion gases flow, and/or the electrical heat exchanger and the temperature of the heat transfer oil is regulated as a function of a variable reference, whereby the variable reference is that temperature below which the cleaning agent cleans the tank or tank container.

In yet another embodiment of the invention the temperature of the cleaning agent is additionally controlled as a function of the air which has to be added to the exhaust gases flowing through the heat exchanger.

In order to achieve as high a temperature of the cleaning agent as possible, the hot exhaust gases flow in yet another embodiment of the invention through an arrangement for additional combustion of fuel and/or of the soot particles in diesel exhaust gases, said arrangement being located upstream ahead of the heat exchanger through which the heat transfer oil flows.

In yet another embodiment of the invention the hot exhaust gases flow for temperature regulation of the cleaning agent through an additional heat exchanger through which heat exchanger oil flows and which is arranged downstream behind the heat exchanger through which the heat transfer oil flows.

Here again advantage is taken of the fact that the exhaust gases cool with increasing distance from the engine and thus can transfer less heat to the heat transfer oil.

It is also basically possible to operate the first heat exchanger if the temperature of the cleaning agent is to be high and to operate the second heat exchanger if it is to be relatively low.

It is also possible to utilize both heat exchangers simultaneously in order to predetermine the temperatures of the inner wall of the tank or the tank container and the cleaning agent independently of each other.

Thus the temperature of the inner wall can be as low, that at the prevailing temperature of the surroundings a crystallization or adhesion of residual commodity cannot yet take place, while the temperature of for instance steam is so high that it condenses at the inner wall and washes the residual commodity away.

In yet another version of the embodiment example the heat transfer oil flows through a heat exchanger acted upon by the ambient air for the purpose of temperature regulation of the cleaning solution.

It is possible by these measures to predetermine the temperature of the cleaning agent within wide limits during the travel, especially for instance to begin with at low temperatures to perform a first cleaning step and to select a temperature higher only when this is for instance necessary for a cleaning operation after a transport of oil or liquid.

According to a second embodiment principle the heat transfer oil is conducted in a closed cycle through at least two regulation circuits; in the first regulation circuit comprising the heat exchanger through which the exhaust gases flow and/or the electrical heat exchanger the temperature of the heat transfer oil is regulated as a function of the variable reference, in the second regulation circuit comprising at least a heat exchanger for transfer of heat to the cleaning agent the temperature is regulated as a function of a second variable reference, and the second variable reference is preset depending on the temperature of the cleaning process which has to be performed.

The second variable reference can be preset by an individual program or by a program in stages (just as in a washing machine).

In another embodiment of the invention the heat transfer oil flows through the apparatus for heating the cleaning agent arranged in the first circulation cycle. This is advantageous especially if high temperatures are required during the cleaning process.

In yet another embodiment of the invention the heat transfer oil flows through an apparatus for heating and/or evaporating the cleaning agent arranged in the second circulation cycle. This is especially advantageous if low temperatures are specified during the cleaning operation.

In another refinement of the second embodiment principle heat transfer oil is circulated additionally in a third regulation circuit, which comprises the apparatus for heating and/or evaporating the cleaning agent and where the temperature of the heat transfer oil is controlled as a function of an additional variable reference.

The variable reference is also the temperature of the cleaning medium at which the cleaning operation is performed.

In yet another refinement of the invention the temperature of the heat transfer oil in the first and second embodiment principle is regulated to an adjustable constant value by supplying outside air to the exhaust gases flowing through the heat exchanger. Thus we obtain a regulation which is practically independent of whether the internal combustion engine is operated at full or partial load.

In order to reliably prevent exceeding the specified cleaning temperature under extreme operational conditions, for instance on long upward slopes, the heat transfer oil flows in yet another embodiment of the invention through a heat exchanger additionally arranged in the first regulation circuit losing heat to said heat exchanger; this is provided for regulating the temperature of the heat transfer oil in the first regulation circuit to a predeterminable desired value.

Alternately, the heat transfer oil can pass while yielding heat through a heat exchanger additionally arranged in the second regulation circuit; this also for regulating the temperature of the heat transfer oil to a predeterminable value.

In yet another embodiment of the first and second design principles the residues of the commodity being transported located on the inside wall are transposed by the cleaning agent into a vapor and/or gaseous phase and are subsequently condensed (degasifying) in the lower region of the tank or the tank container and are directed to recycling or waste disposal; this by collecting them in a collection reservoir, said reservoir being sent to the manufacturer or a waste disposal plant. Additional precautions have to be taken, so that vapors generated for being collected in the collection reservoir cannot flow back into the tank. Therefore they are condensed in an additional container or reservoir.

Furthermore, the invention provides that at the start of the cleaning process the tank or the container are heated or heated in stages to a predetermined temperature, wherein in the course of the cleaning phase the temperature of the tank or the tank container is lowered or lowered in stages to a predetermined temperature.

Subsequently the inner wall of the tank or the tank container can in the invention be dried by heating. Especially thin films of water can be reliably removed, which react with some chemical products.

These measures furthermore assure sterilization of the inside wall of tanks and tank containers in cases where this is required.

The task of creating an apparatus for transportation of commodities especially of liquid commodities at a predetermined temperature above their congealing temperature, comprising at least one heat exchanger, through which flows at least a partial flow of the hot exhaust gases of the internal combustion engine of a tank or tank container vehicle and through which passes heat transfer oil in a closed circulation cycle and/or an electrically heated heat exchanger, through which heat transfer oil passes in a closed cycle and at least an additional heat exchanger, through which heat transfer oil passes for transmitting heat to the commodity contained in the tank or the tank container, is solved in the invention in that the heat exchanger comprises an air supply line having a control valve for additional regulation of the temperature of the heat transfer oil as a function of the exhaust gases passing through the heat exchanger.

It was seen surprisingly that this creates a simple arrangement for reliable transportation of commodities at a predetermined temperature.

According to a second basic solution the task is solved with an apparatus comprising at least one heat exchanger through which flows at least a partial stream of the hot exhaust gases of the internal combustion engine of a tank- or tank container vehicle and through which passes heat transfer oil in a closed cycle and/or an electrically heated heat. exchanger through which passes the transfer oil in a closed cycle for the transfer of heat to the commodity contained in the tank or the tank container, in that the apparatus has at least two regulation circuits for the heat transfer oil flowing in a closed cycle, that the heat exchanger with the internal combustion gas throughflow and/or the electrical heat exchanger is or are arranged in the first regulation circuit, wherein the first regulation circuit comprises an actuating link for temperature regulation of the heat transfer oil as a function of a variable reference, that in the second regulation circuit at least one heat exchanger for transmitting heat of the heat transmittal oil to the tank or tank container contents is arranged and that a actuating link for the regulation of the temperature as a function of the variable reference or a second variable reference is also present there.

These measures create an apparatus, which very rapidly and accurately compensates any deviations from the desired temperature, in that a relatively large quantity of heat transfer oil absorbs the heat yielded from the exhaust gases in the first regulation circuit and because of its high heat capacity equalizes extreme and rapid temperature fluctuations and where the heat transfer oil in the second regulation circuit assures a precise regulation of the specified temperature because of its low flowing quantity of oil therein.

The variables reference correspond to the variable references explained above.

In accordance with another embodiment of the invention the arrangement comprises at least one regulator with an analog computer or at least one digital computer (microcomputer), which determines the adjustment magnitudes for the actuating links from the data of the sensors (temperature sensor and possibly pressure sensor) by means of a program for the individual products or with the help of stored experimental data for the individual commodities.

It is achieved by these measures that the adjustment magnitudes can be determined practically without any time delay, so that a rapid regulation during transportation of the commodities and in the course of cleaning and/or sterilization occurs.

In yet another embodiment of the invention the apparatus comprises a control panel for the input of the names of the individual commodities and the quantities of same which have to be transported or of the cleaning program for the individual products.

These measures for the utilization of computers create practically a purely automatically functioning arrangement and indeed by means of appropriately stored programs for the individual commodities for their transport as well as for cleaning and sterilization.

According to another solution principle the arrangement for transportation of commodities especially of liquid commodities above their congealing temperature in tanks or tank containers and/or for cleaning the tanks or the tank containers comprises at least one heat exchanger, through which at least a partial stream of hot exhaust gases of the internal combustion engine of a tank or tank container vehicle flow and through which heat transfer oil passes in a closed cycle and/or an electrically heated heat exchanger, through which heat transfer oil passes in a closed cycle and at least an additional heat exchanger through which heat transfer oil passes for the transfer of heat to the commodity contained in the tank or the tank container. In the invention a computer, which computes the respective quantity of the fuel/air mixture for injection into the internal combustion engine from the acquired data, computes additionally the heat quantities yielded per unit time to the heat exchanger downstream of the internal combustion engine and forms therefrom the variable reference for the regulation circuit or the several regulation circuits for the heat transfer oil circulating in a closed cycle.

These measures create with the use of microcomputers a universal apparatus utilizable in actual practice for all commodities to be transported and all tanks or tank containers to be cleaned.

The invention is described in the drawings with the help of embodiment examples.

BRIEF DESCRIPTION OF THE DRAWING

It is shown on.

DESCRIPTION OF THE PREFERRED EMBODIMENT

Identical parts are given identical designation numbers.

Figure 1:
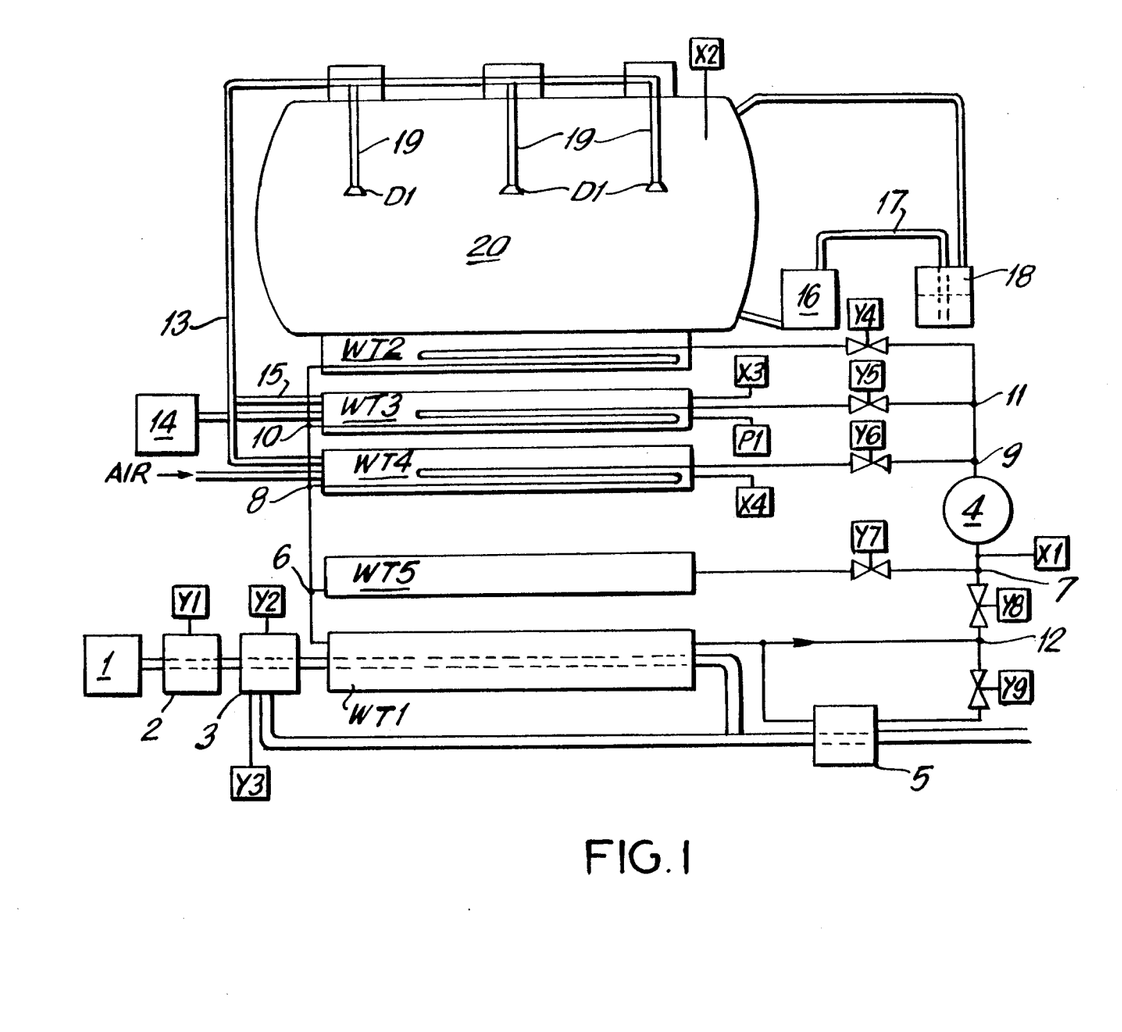
FIG. 1 schematically a block circuit diagram of a control arrangement for the transportation of commodities in a tractor semi-trailer vehicle and the subsequent cleaning of the tanks, FIG. 2 diagrammatically the control panel and the control instrument in the block diagram in FIG. 1, FIG. 3 an additional block diagram of a regulation arrangement for the transportation with a regulating circuit, FIG. 4 still another block diagram for the transportation of commodities and the subsequent cleaning of the tank with two regulation circuits and FIG. 5 a tank container for transportation on highway and/or on rails.

In FIG. 1 the temperatures are designated with $X_n$ and the adjustment or actuation links by $Y_n$ in accordance with DIN standards.

An exhaust pipe Ep conveys the engine exhaust gases from the engine or a gas turbine 1, which in the present case is a diesel motor, through an arrangement 2 for the additional combustion of fuel, in the present case for diesel fuel or of another fuel for instance a heating oil, so that too low a temperature of the exhaust gas flow passing through the heat exchanger WT1 is avoided in the partial load range operation. Furthermore the apparatus is designed for burning of soot particles of the diesel exhaust gases.

The apparatus 2 comprises an adjustment valve Y1 for regulating the air supply to the non-depicted burner.

After the apparatus 2 the exhaust gases pass through the apparatus 3, which can supply air to the exhaust gas stream by means of an adjustment valve Y2, if excessive heating of the heat transfer oil at full load operation, for instance on steep inclines is envisaged.

The arrangement comprises an adjustment valve Y3 for the same purpose, which in these cases can convey a partial flow of the exhaust gases in a bypass past the heat exchanger WT1, this in addition or instead of the air supply.

Having passed through arrangement 3 the exhaust gases flow through the heat exchanger WT1, throught which heat transfer oil passes in a closed cycle, which yields heat to the tank contents of the tank through the heat exchanger WT2.

After having flowed through the heat exchanger WT1 the exhaust gases flow through the heat exchanger 5 which as depicted is arranged in the closed cycle of the heat transfer oil and can supply heat for the commodity to the heat exchanger WT2 instead of the heat exchanger WT1.

The layout can also be in such a way that the temperature of the heat transfer oil is regulated by means of both heat exchangers WT1 and 5.

The heat exchanger 5 can also have the function of an emergency cooler; in this case the exhaust pipe is conducted past said heat exchanger in deviation from the illustration in FIG. 1.

The heat exchanger 5 can also be arranged in such a manner that it serves as a warm water generator and/or a steam generator for the cleaning of the tank or the tank container, so that the heat exchanger WT3 can possibly be eliminated.

In the depicted arrangement of the heat exchanger 5 the adjustment valve Y9 is located downstream of the branch 12 in direction of the heat exchanger.

Nozzles D1 are arranged in the tank for cleaning purposes, which can be supplied with hot air or water or steam through the lines 13 or 14.

The tank comprises a temperature sensor D2, with whose values and the variable reference the actuation magnitude of the adjustment valve Y4 is formed. The temperature sensor X1 is assigned as a sensor to the heat exchanger WT1 and the later explained heat exchanger WT5.

A circulating pump 4 is arranged in the closed circuit of the heat transfer oil, which pumps the heat transfer oil through the heat exchanger WT2 back to the heat exchanger WT1 and which during the cleaning process pumps heat transfer oil either additionally through the arrangement for the cleaning agent yet to be explained or only through this arrangement back to the heat exchanger WT1.

The electrically heatable heat exchanger WT5 with its regulating or adjustment valve Y7 is arranged in the bypasses 6 and 7 parallel to the heat exchanger WT1 in the closed cycle of the heat transfer oil.

Furthermore the heat exchanger WT4, which serves for generation of warm or hot air for drying the tanks, with its adjustment valve Y6 and the temperature sensor X4 or is arranged in a parallel manner in the branches 8 and 9.

Furthermore the heat exchanger WT3 which serves for generating of warm or hot cleaning agent for instance of warm or hot water and steam, with its adjustment valve Y5 and a sensor Pl designed as a pressure sensor is arranged in a parallel fashion in the branches 10 and 11.

In case of necessity surrounding ambient air is supplied to the heat exchanger WT4 which is brought to the appropriate temperature and fed through the line 13 to the tank in the course of drying the tank.

The cleaning agent is supplied to the heat exchanger WT3 from the storage reservoir 14, which agent has been heated to the predetermined temperature and, in case water is used, is transposed into a steam phase and is supplied to the nozzles D1 through the line 15 and the line 13.

The tank is connected with a coupleable collection reservoir, which receives the product residues and the cleaning agent supplied to the tank.

The collection reservoir 16 is heatable so that solidified product residues can be translated into the liquid phase by heating and can be pumped out in the plant or at the unloading station.

A gas line 17 leads from the collection reservoir to a condenser 18 for separation of the vapors generated in the collection reservoir above the liquid level.

Figure 2A:
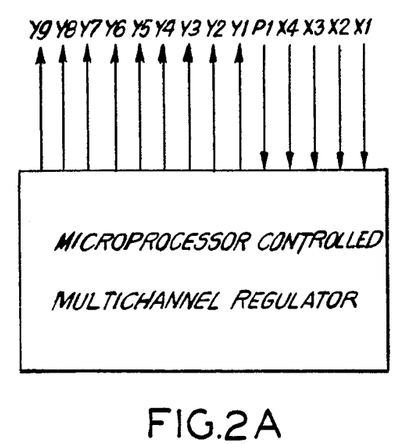
Figure 2B:
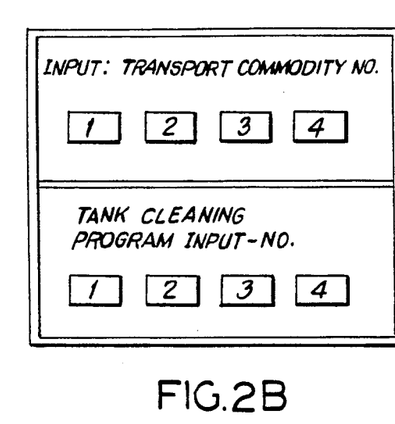

FIG. 2 shows the control panel for the apparatus in FIG. 1 for input of the numbers of numbered transport commodities and the cleaning programs.

Furthermore FIG. 2 shows diagrammatically the control instrument with the input and output for the sensors or actuators.

Figure 3:
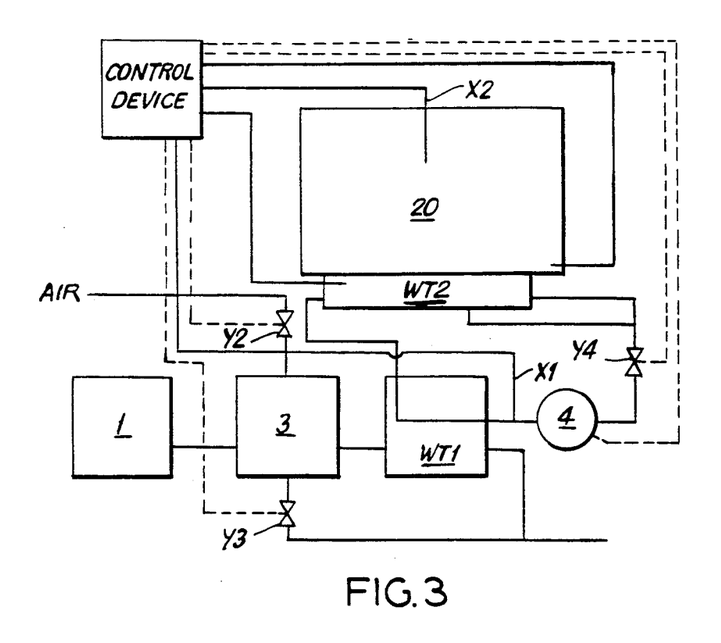

FIG. 3 shows an arrangement comprising a regulation circuit for transport of commodities at a predetermined temperature.

Here parts which are identical with those in FIG. 1 have been given the same designation numbers.

The apparatus comprises a control instrument, which is connected by signal lines (shown in full lines) with sensors and by control lines (shown in broken dotted lines) with the actuating or adjustment valves (actuator links or actuators).

Figure 4:
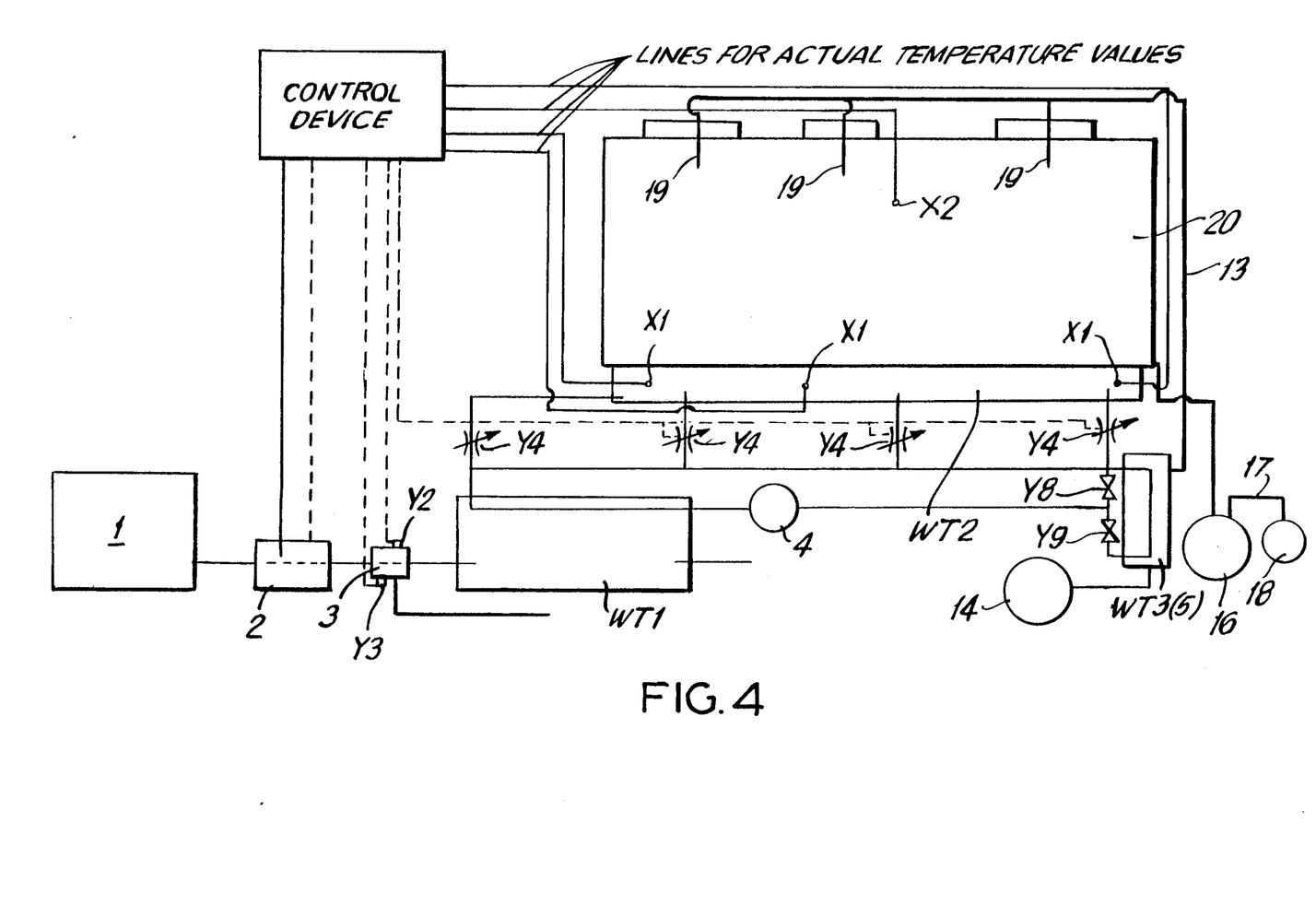

FIG. 4 shows an apparatus for transportation of commodities and for cleaning the tanks with two regulation circuits, wherein it is possible to clean with water or steam underway or at standstill. The difference compared to FIG. 2 is that the heat exchanger WT2 is arranged in a second regulation circuit.

Parts which are identical with those in FIG. 1 are given the same designation numbers.

Differing from FIG. 1 the heat exchanger WT1 and WT2 are respectively arranged in one of the two regulation circuits, through which the heat transfer oil circulating in a closed cycle flows. For cleaning purposes the nozzles D1 are coupled to the line 19 and suspended in the tank 20.

Figure 5:
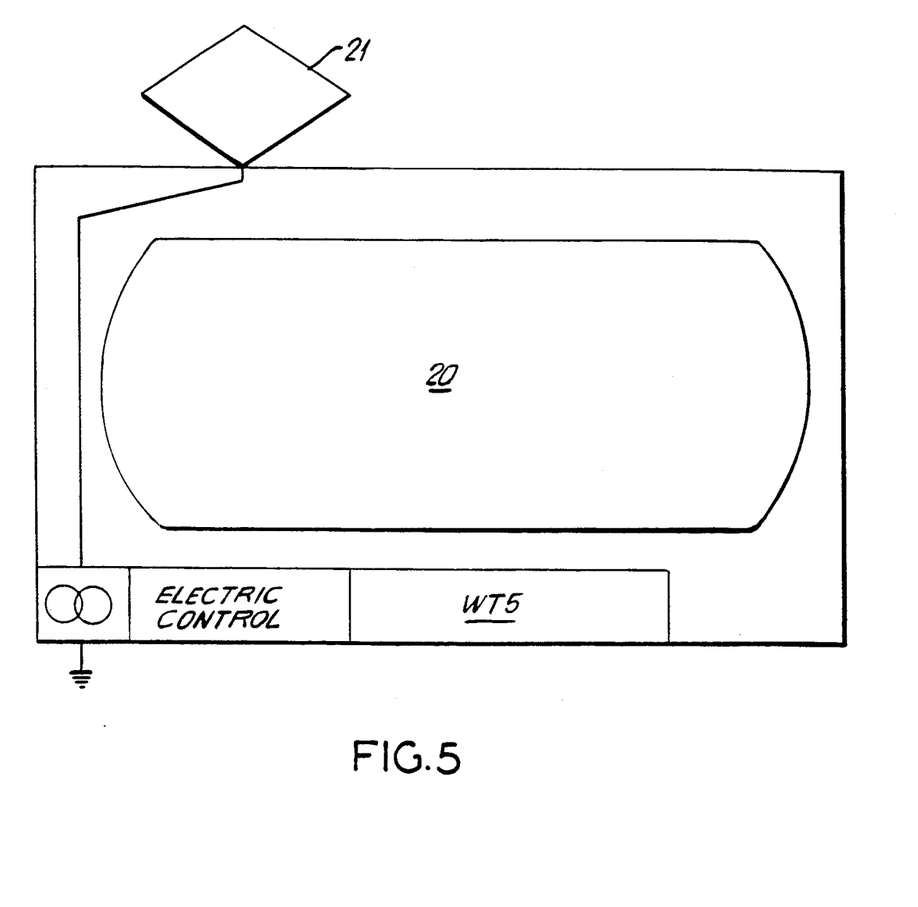

FIG. 5 shows diagrammatically a tank container laid out corresponding to FIGS. 1, 2 and 3 or 4 and whose electrical heat exchanger WT5 is supplied through the overhead line of a railroad network. A current collector 21 is provided for this purpose, through which the electric heat exchanger is supplied with energy having passed through a rectifier and a control instrument.

We claim:

1. In a method for transporting commodities above their congealing temperature in tanks, wherein at least a partial flow of hot exhaust gases of an internal combustion engine of a tank vehicle or tank container vehicle flows through a first heat exchanger through which passes heat transfer oil in a closed cycle and yields heat to the heat transfer oil and wherein an electrically heated heat exchanger yields heat to the heat transfer oil and the heat transfer oil transfer heat to the commodity through a tank wall heat exchanger, the improvement comprising conducting the heat transfer oil in a closed cycle in a regulation circuit including one of the first heat exchanger and the electrically heated heat exchanger, and controlling the temperature of the heat transfer oil as a function of a variable reference, and presetting the variable reference as a function of the temperature of the commodity to be transported and contained in the tank or the tank container, such that the variable reference is always higher than a specified temperature of the commodity to be transported.

2. Method according to claim 1, comprising controlling the temperature of the heat transfer oil is additionally as a function of air being supplied to the exhaust gases flowing through the first heat exchanger.

3. Method according to claim 1 or 2, comprising conducting the hot exhaust gases flow through an arrangement for additional combustion of fuel and for combustion of soot particles contained in the diesel exhaust gases, said arrangement being located upstream of the first heat exchanger through which the heat transfer oil flows.

4. Method according to claim 3, wherein for purposes of temperature regulation of the heat transfer oil, the hot exhaust gases are conducted through a second heat exchanger through which the heat transfer oil passes said second heat exchanger being arranged downstream of the first heat exchanger through which heat transfer oil passes.

5. Method according to claim 1, wherein, for purposes of temperature regulation, the heat transfer oil is conducted additionally through a first heat exchanger acted upon by ambient air.

6. In a method for transporting commodities above their congealing temperature in tanks, wherein at least a partial flow of hot exhaust gases of an internal combustion engine of a tank vehicle or tank container vehicle flows through a first heat exchanger through which heat transfer oil passes in a closed cycle and yields heat to the heat transfer oil and an electrically heated heat exchanger yields heat to the heat transfer oil and the heat transfer oil transfer heat to the commodity through a tank wall heat exchanger, the improvement comprising circulating the heat transfer oil in a closed cycle in at least two regulating circuits, wherein the first regulating circuit includes one of the first exchanger, and the electrically heated heat exchanger, controlling the temperature of the heat transfer oil as a function of a variable reference, and controlling the temperature in the second regulating circuit including at least one additional exchanger for transmittal of heat of the heat transfer oil to contents of the tank, the temperature as a function of one of a variable reference, and predetermining the variable reference and the additional variable reference as a function of the temperature of the commodity to be transported and contained in the tank, such that the variable reference is always higher than a specified temperature of the commodity to be transported.

7. Method according to claim 6, comprising controlling the temperature of the heat transfer oil additionally as a function of air being to the exhaust gases flowing through the first heat exchanger.

8. Method according to claim 6 or 7, comprising conducting the hot exhaust gases through an arrangement for additional combustion of fuel and for combustion of soot particles contained in the hot exhaust gases, said arrangement being located upstream of the first heat exchanger.

9. Method according to claim 8, wherein, for temperature control of the heat transfer oil the hot exhaust gases are conducted through a second additional heat exchanger, through which heat transfer oil passes, said second additional heat exchanger being located downstream the of first heat exchanger.

10. Method according to claim 6, wherein for purposes of temperature control, the heat transfer oil is conducted additionally flows through a further heat exchanger acted upon by ambient air.

11. Method for cleaning tanks and tank containers with a cleaning agent after terminated transportation of liquid commodities above their congealing temperature, hot exhaust gases of a combustion engine of a tank vehicle or container vehicle through a first heat exchanger, through which heat transfer oil passes in a closed cycle and yields heat to the heat transfer oil and wherein an electrically heated heat exchanger yields heat to heat transfer oil flowing in a closed cycle and the heat transfer oil transfers heat to an apparatus for heating and for evaporating a cleaning agent used for cleaning the tank or the tank container.

12. Method according to claim 11, wherein the heat transfer oil transfers heat to a tank wall heat exchanger.

13. Method according to claim 11, comprising conducting the heat transfer oil including one of the heat exchanger through which combustion gases flow and the electrically heated heat exchanger, and controlling the temperature of the heat transfer oil as a function of a variable reference and presetting the variable reference as a function of the temperature of the cleaning agent.

14. Method according to claim 13, wherein the temperature of the cleaning agent is additionally regulated as a function of air supplied to the exhaust gases flowing through the heat exchanger.

15. Method according to claim 14, comprising conducting the hot exhaust gases through an apparatus for additional combustion of fuel and for combustion of soot particles contained in diesel exhaust gases, said apparatus being located upstream of the first heat exchanger.

16. Method according to claim 11, wherein, for purposes of temperature regulation of the cleaning agent, the hot exhaust gases conducted through a second additional heat exchanger arranged downstream of the heat exchanger flowed through by heat transfer oil.

17. Method according to claim 11, wherein, for temperature regulation of the cleaning agent, the heat transfer oil is conducted through a heat exchanger acted upon by ambient air.

18. Method according to claim 11, comprising conducting the heat transfer oil in a closed cycle through at least two regulation circuits, wherein, in the first regulation circuit including one of the first heat exchanger and the electrically heated heat exchanger, regulating the temperature of the heat transfer oil as a function of a variable reference, and regulating the temperature in the second regulation circuit including at least one heat exchanger for transmittal of heat of the heat transfer oil to the cleaning agent as a function of one of the variable reference and an additional variable reference, and presetting the variable reference as a function of a cleaning process to be performed.

19. Method according to claim 18, comprising conducting the heat transfer oil through an apparatus arranged in the first circulation cycle for heating and evaporating a cleaning agent used in the cleaning process.

20. Method according to claim 18, comprising conducting the heat transfer oil through an apparatus arranged in the second circulation cycle for heating and evaporating a cleaning agent used in the cleaning process.

21. Method according to claim 18, comprising controlling the temperature of the heat transfer oil as a function of a reference variable of a cleaning process being performed in a third regulation circuit including an apparatus for heating an evaporating the cleaning agent.

22. Method according to claim 21, wherein the temperature of the heat transfer oil is regulated to an adjustable constant value by addition of external air to the exhaust gases flowing through the first heat exchanger.

23. Method according to claim 22, wherein, for regulating the temperature of the heat transfer oil to a predetermined desirable value in this first regulation circuit, the heat transfer oil flows through an additional heat exchanger arranged in the first regulation circuit while yielding heat to said additional heat exchanger.

24. Method according to claim 21 wherein, for regulating the temperature of the heat transfer oil to a predeterminable desired value in the second regulating circuit the heat transfer oil is conducted through a heat exchanger additionally arranged in the second regulation circuit while yielding heat to said second heat exchanger.

25. Method according to claim 11, wherein residues of the commodity transported remaining on an inner wall of the tank or the tank container are transmuted by superheated steam into one of a steam and a gaseous phase, and the residues subsequently are condensed in a lower region and are disposed of or returned to recycling.

26. Method according to claim 11, wherein the residues of the transported commodity located on an inner wall of the tank or the tank container are rinsed away by warm water into a collection container together with said water.

27. Method according to claim 18, comprising heating the tank to a preset temperature at the start of the cleaning process, wherein, during the cleaning process, the temperature of the tank is maintained at said predetermined temperature.

28. Method according to claim 11, wherein an inside wall of the tank is dried by heating.

29. Method according to claim 18, wherein sterilization of the tank is performed together with the cleaning process.

30. Apparatus for transporting commodities above their congealing temperature in tanks, comprising at least one first heat exchanger flowed through by at least a partial flow of hot exhaust gases of an internal combustion engine of a tank vehicle and an electrically heated heat exchanger through which heat transfer oil flows in a closed cycle, and at least one additional heat exchanger through which heat transfer oil flows for transferring heat to the commodity contained in the tank, the heat exchanger comprising an arrangement with a regulation valve for supply of air for additional control of the temperature of the heat transfer oil as a function of the exhaust gases flowing through the heat exchanger.

31. Apparatus according to claim 30, comprising an arrangement (3) for additional combustion of fuel and for combustion of soot particles in diesel exhaust gases arranged upstream of the first heat exchanger through which the exhaust gases and the heat transfer oil flows, which arrangement yields the heat thus generated to the exhaust gases.

32. Apparatus according to claim 30 or 31, comprising a second additional heat exchanger (5) through which the exhaust gases and the heat transfer oil flow, is arranged for temperature control of the heat transfer oil downstream of the first heat exchanger, through which the exhaust gases and the heat transfer oil flow.

33. Apparatus according to claim 32, additionally comprising a third heat exchanger for temperature control of the heat transfer oil acted upon by ambient air and flowed through by heat transfer oil.

34. Apparatus for transporting commodities, above their congealing temperature in tanks, comprising a heat exchanger flowed through by at least a partial stream of hot exhaust gases of an internal combustion engine of a tank vehicle and through which heat transfer oil flows in a closed cycle and an electrically heated heat exchanger through which a heat transfer oil flows in a closed cycle, and at least an additional heat exchanger flowed through by heat transfer oil for transfer of heat to the commodity contained in the tank, the apparatus further comprising at least two regulation circuits for the heat transfer oil conducted in a closed cycle, wherein the first regulation circuit includes one of the heat exchanger flowed through by the combustion gases and the electrically heated exchanger and an adjustment link for the control of the temperature of the heat transfer oil as a function of a variable reference, and wherein the second regulation circuit includes at least one heat exchanger for transfer of heat from the heat transfer oil to the contents of the tank or the tank container and an actuation link for temperature control as a function of one of a variable reference and an additional variable reference.

35. Apparatus according to claim 34, wherein heat exchanger of the first regulation circuit comprises an arrangement with a regulation valve for supply of air for additional control of the temperature of the heat transfer oil as a function of the exhaust gases flowing through the heat exchanger.

36. Apparatus according to claim 35, comprising an arrangement for additional combustion of fuel and for combustion of soot particles in diesel exhaust gases arranged upstream of the first heat exchanger, which arrangement yields heat to the exhaust gases.

37. Apparatus according to claim 36, comprising a second heat exchanger flowed through by the exhaust gases and by heat transfer oil arranged for temperature control of the heat transfer oil downstream of the heat exchanger in the first regulation circuit through which the exhaust gases and the heat transfer oil flow.

38. Apparatus according to claim 36 wherein the apparatus additionally comprises a third heat exchanger for temperature control of the heat transfer oil arranged in the first or second regulation circuit flowed through the heat transfer oil and through which the ambient air passes.

39. Apparatus for cleaning tanks and tank containers with a cleaning agent after terminated transportation of liquid commodities above their congealing temperature, the apparatus comprising at least one heat exchanger flowed through by hot exhaust gases of an internal combustion engine of a tank vehicle and through which heat transfer oil passes in a closed cycle and an electrically heated heat exchanger through which heat transfer oil passes in a closed cycle for an arrangement for heating an vaporizing a cleaning agent for cleaning the tanks or the tank containers.

40. Apparatus according to claim 38, wherein the apparatus comprises a heat exchanger for transferring heat to the tank or the tank container.

41. Apparatus according to claim 39, wherein that the apparatus additionally comprises a third heat exchanger flowed through by the heat transfer oil and through which ambient air passes for temperature control of the cleaning agent.

42. Apparatus according to claim 41, comprising in that an arrangement for additional combustion of fuel and for combustion of soot particles in the diesel exhaust gases arranged upstream of the heat exchanger flowed through by the exhaust gases and the heat transfer oil, which arrangement yields the heat generated to the exhaust gases.

43. Apparatus according to claim 41, comprising in that a second additional heat exchanger flowed through by the exhaust gases and the heat transfer oil arranged for temperature control of the cleaning agent downstream the heat exchanger flowed through by the exhaust gases and the heat transfer oil.

44. Apparatus according to claim 39, wherein in that the apparatus additionally comprises a third heat exchanger for temperature control of the cleaning agent, through which heat transfer oil flows and ambient air passes.

45. Apparatus for cleaning tanks and tank containers with a cleaning agent after terminated transportation of liquid commodities above their congealing temperature, the apparatus comprising at least two regulation circuits for the heat transfer oil conducted in a closed cycle, the heat exchanger flowed through by the exhaust gases and/or the electrical heat exchanger being arranged in the first regulation circuit, wherein the first regulation circuit comprises an actuating link for the temperature control of the heat transfer oil as a function of a reference variable, and wherein the second regulation circuit includes at least one heat exchanger for transmitting heat to a cleaning agent as a function of an additional reference variable determined by cleaning process.

46. Apparatus according to claim 46, wherein the heat exchanger in the first regulation circuit comprises an arrangement with a regulating valve for supply of air for additional temperature control of the cleaning agent as a function of the exhaust gases flowing through the heat exchanger.

47. Apparatus according to claim 45, comprising an arrangement for additional combustion of fuel and for combustion of soot particles in diesel exhaust gases arranged upstream of the heat exchanger in the first regulation circuit flowed through by the exhaust gases and the heat transfer oil, which arrangement yields the heat thus produced to the exhaust gases.

48. Apparatus according to claim 45 comprising a second heat exchanger flowed through by the exhaust gases and the heat transfer oil is arranged for temperature control of the cleaning agent downstream of the heat exchanger flowed through by the exhaust gases and the heat transfer oil.

49. Apparatus according to claim 48, wherein, the apparatus comprises additionally a third heat exchanger in one of the first and second regulation circuits, through which heat transfer oil flows and through which ambient air passes for temperature control of the cleaning agent.

50. Apparatus according to claim 48 characterized in that the apparatus comprises regulators with one of an analog and a digital computer, for determining the adjustment magnitudes for the actuating links from the data of the sensors by means of a program for the individual products or by means of stored experimental data for the individual products.

51. Apparatus according to claim 50, wherein the apparatus comprises a control panel for input of names of individual products and their quantity to be transported or of a cleaning program for the individual products.

52. Apparatus for transporting commodities above their congealing temperature in tanks and for cleaning the tanks, comprising at least one heat exchanger flowed through by at least a partial stream of hot exhaust gases of and internal combustion engine of a tank vehicle and through which heat transfer oil passes in a closed cycle and an electrically heated heat exchanger through which the heat transfer oil passes in a closed cycle for transmittal of heat to the commodity contained int he tank or the tank container, further comprising a computer which computes a respective quantity of fuel air mixture to be injected into the internal combustion engine, wherein the computer comprises means for computing from the computed quantity of fuel air mixture heat quantities yielded per unit time and for forming a variable reference for at least one regulation circuit in a closed cycle.

* * * * *